US010789958B2

(12) United States Patent
Baughman et al.

(10) Patent No.: US 10,789,958 B2
(45) Date of Patent: *Sep. 29, 2020

(54) SPEAKER DIARIZATION WITH CLUSTER TRANSFER

(71) Applicant: INTERNATIONAL BUSINESS MACHINES CORPORATION, Armonk, NY (US)

(72) Inventors: Aaron K. Baughman, Cary, NC (US); Stephen C. Hammer, Marietta, GA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/588,426

(22) Filed: Sep. 30, 2019

(65) Prior Publication Data
US 2020/0027463 A1 Jan. 23, 2020

Related U.S. Application Data

(63) Continuation of application No. 15/476,340, filed on Mar. 31, 2017, now Pat. No. 10,559,311.

(51) Int. Cl.
G10L 17/06 (2013.01)
G06F 3/16 (2006.01)
G10L 17/04 (2013.01)

(52) U.S. Cl.
CPC ............ G10L 17/06 (2013.01); G06F 3/165 (2013.01); G10L 17/04 (2013.01)

(58) Field of Classification Search
CPC .......... G06F 3/165; G10L 17/06; G10L 17/04
USPC .......................................................... 704/245
See application file for complete search history.

(56) References Cited

U.S. PATENT DOCUMENTS

| 8,543,402 | B1 | 9/2013 | Ma |
| 9,443,521 | B1 | 9/2016 | Olguin Olguin et al. |
| 10,559,311 | B2* | 2/2020 | Baughman .............. G06F 3/165 |
| 2016/0140956 | A1 | 5/2016 | Yu et al. |
| 2016/0283185 | A1 | 9/2016 | McLaren et al. |
| 2016/0343373 | A1 | 11/2016 | Ziv et al. |
| 2017/0323643 | A1 | 11/2017 | Arslan et al. |
| 2018/0158463 | A1 | 6/2018 | Ge et al. |
| 2018/0286409 | A1 | 10/2018 | Baughman et al. |

OTHER PUBLICATIONS

Bredin, Helvé, et al., "Improving Speaker Diarization of TV Series using Talking-Face Detection and Clustering", ACM MM 2016, Oct. 15-19, 2016, Amsterdam, Netherlands, 5 pgs.
(Continued)

Primary Examiner — Farzad Kazeminezhad
(74) Attorney, Agent, or Firm — James Nock, Esq.; George S. Blasiak, Esq.; Heslin Rothenberg Farley & Mesiti P.C.

(57) ABSTRACT

Methods, computer program products, and systems are presented. The methods include, for instance: obtaining the media file with a speech and identifying speakers on clusters separated by disfluencies and change of speakers. Clusters are re-segmented rearranged during diarization. Speaker identifications for the clusters in the media file is produced.

20 Claims, 5 Drawing Sheets

(56) References Cited

OTHER PUBLICATIONS

Pironkov, Gueorgui, et al., "Speaker-Aware Long Short-Term Memory Multi-Task Learning for Speech Recognition", IEEE 2016 24th European Signal Processing Conference (EUSIPCO), 5 pgs.

Poignant, Johann, et al., "Unsupervised Speaker Identification in TV Broadcast Based on Written Names", IEEE / ACM Transactions on Audio, Speech, and Language Processing, vol. 23, No. 1, Jan. 2015, 12 pgs.

Friedland, Gerald, et al., "Dialocalization: Acoustic Speaker Diarization and Visual Localization as Joint Optimization Problem". ACM Trans. Multimedia Comput. Commun. Appl. 6, 4, Article 27 (Nov. 2010), 18 pgs.

Huang, Zhen, et al., "Bayesian Unsupervised Batch and Online Speaker Adaptation of Activation Function Parameters in Deep Models for Automatic Speech Recognition", IEEE / ACM Transactions on Audio, Speech, and Language Processing, vol. 25, No. 1, Jan. 2017, 12 pgs.

Shahar, Ori, et al., "Speaker Diarization Based on Locally Linear Embedding", IEEE, ICSEE International Conference on the Science of Electrical Engineering, 2016, 4 pgs.

Mell, Peter, et al., "The NIST Definition of Cloud Computing", NIST Special Publication 800-145, Sep. 2011, Gaithersburg, MD, 7 pgs.

"Speech Analysis for Speaker Diarization and Spoken Language Identification", Shodhganga, Annamalai University, 2010, 139 pgs.

"Step-by-step and Integrated Approaches in Broadcase News Speaker Diarization", S. Meignier, D. Moraru, C. Fredouille, J-F Bonastre, L. Besacier, Computer Speeach and Language 20 (2006) 303-330.

"Edit Dlsfluency Detection and Correction Using a Cleanup Language Model and an Alignment Model", J-F Yeh, C-H Wu, IEEE Transactions on Audio, Speech, and Language Processing, vol. 14, No. 5, Sep. 2006, 10 pgs.

Non-Final Office Action, U.S. Appl. No. 15/476,340, filed Mar. 31, 2017, dated Jul. 11, 2018.

P. Mell, et al. "*The NIST Definition of Cloud Computing*", NIST Special Publication 800-145, Sep. 2011, Gaithersburg, MD.

Applicant's Response to Non-Final Office Action, U.S. Appl. No. 15/476,340, filed Mar. 31, 2017, dated Dec. 11, 2018.

Final Office Action, U.S. Appl. No. 15/476,340, filed Mar. 31, 2017, dated Feb. 28, 2019.

Applicant's Response to Final Office Action, U.S. Appl. No. 15/476,340, filed Mar. 31, 2017, dated May 24, 2019.

Notice of Allowance, U.S. Appl. No. 15/476,340, filed Mar. 31, 2017, dated Jun. 19, 2019.

Notice of Allowance, U.S. Appl. No. 15/476,340, filed Mar. 31, 2017, dated Oct. 2, 2019.

List of IBM Patents or Applications Treated as Related, Oct. 3, 2019, 2 pgs.

\* cited by examiner

US 10,789,958 B2

SPEAKER DIARIZATION WITH CLUSTER TRANSFER

CROSS-REFERENCE TO RELATED APPLICATION

This application is a continuation of U.S. application Ser. No. 15/476,340, filed Mar. 31, 2017, entitled "Speaker Diarization With Cluster Transfer", which is incorporated by reference herein in its entirety.

TECHNICAL FIELD

The present disclosure relates to speaker diarization technology, and more particularly to methods, computer program products, and systems for diarizing speech by use of deep learning and transfer learning on cluster evidences with stratification of media data.

BACKGROUND

In conventional speaker diarization, homogeneous segmentation of an audio stream pursuant to the identity of a speaker may improve readability of an automatic transcription by organizing the audio stream into speaker turns. Speaker diarization may be applicable and improve utility of all kinds of voice communication from broadcasts, entertainment, meeting recordings, voice mail, etc.

SUMMARY

The shortcomings of the prior art are overcome, and additional advantages are provided, through the provision, in one aspect, of a method. The method for diarizing a media file includes, for example: obtaining, by one or more processor, the media file having a speech by one or more speaker; stratifying the media file in order into a plurality of sessions at points of respective disfluencies in the speech; initializing one or more cluster space including one or more cluster, wherein the one or more cluster space respectively corresponds to the one or more speaker, wherein the one or more cluster results from identifying respective speaker of a predetermined number of session from the plurality of sessions; generating a cluster by identifying a speaker of a next session; determining a cluster action for the cluster based on a cluster epicenter of the cluster by use of deep learning; performing the cluster action from the determining on the one or more cluster space; bootstrapping the one or more cluster space resulting from the performing; generating another cluster by identifying speaker corresponding to another session from the rest of the sessions; and producing speaker identifications respective to each cluster from the generating, responsive to ascertaining that one of exit criteria has been detected.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
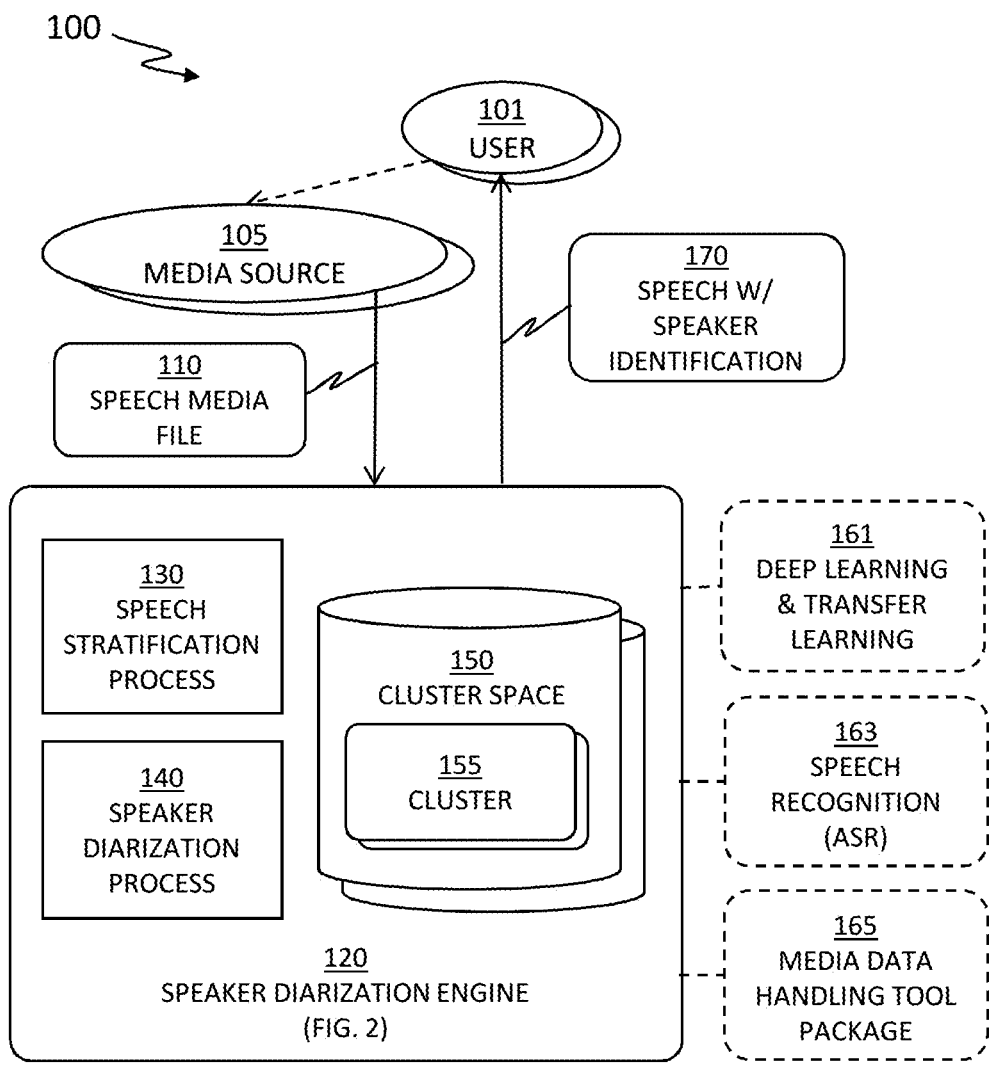
FIG. 1 depicts a system for predictive assistance for impromptu interactions, in accordance with one or more embodiments set forth herein.

FIG. 1 depicts a system 100 for speaker diarization with cluster transfer, in accordance with one or more embodiments set forth herein.

The system 100 for speaker diarization includes a speaker diarization engine 120. One or more user accesses one or more media source in order to view media files. A media source 105 of the one or more media source sends a speech media file 110 to the speaker diarization engine 120 to discover which speaker spoke when in the speech media file 110. The speaker diarization engine 120 provides a speech with speaker identification 170, which includes separate clusters associated with respective speaker and corresponding confidence values for each cluster of speeches of the speech media file 110. In certain embodiments of the present invention, confidence for speaker identity is represented by a probability/probabilistic value between zero (0) and one (1). Typically media files having speeches are not homogeneous for identifying a speaker, and accordingly, the speech media file 110 needs to be divided into smaller portions for speaker diarization.

The speaker diarization engine 120 includes a speech stratification process 130, a speaker diarization process 140, and one or more cluster space corresponding to respective speakers in the one or more speech media files.

The speech stratification process 130 of the speaker diarization engine 120 prepares the speech media file 110 for the speaker diarization process 140 by stratifying the speech media file 110 into sessions at points of disfluencies in the speeches of the speech media file 110 in order to minimize disfluencies in resulting sessions. The speech stratification process 130 may have a preconfigured threshold disfluency length for stratifying the speech media file 110 into the sessions, and any disfluency longer than the preconfigured threshold disfluency length may be cut off from the media file. The speaker diarization engine 120 may utilize a media data handling tool package 165 in order to manipulate the speech media file 110. The media data handling tool package 165 is readily available and external to the speaker diarization engine 120. The speaker diarization engine 120 may utilize a speech recognition tool 163 in order to transcribe the speech media file 110 or sessions diving the speech media file 110. The speech stratification process 130 indicates a functionality of the speaker diarization engine 120 and may or may not be implemented as a separate program process. Further description of the speech stratification process 130 is presented in description of block 210 of FIG. 2.

The speaker diarization process 140 of the speaker diarization engine 120 diarizes the stratified sessions from block 210 by identifying respective speakers with respective confidence. Each session may be regarded as a cluster once a speaker of the session is identified. The speaker diarization process 140 identifies the speakers of the speech media file 110 by use of respective cluster epicenters for each speaker. The speaker diarization process 140 builds the cluster spaces including a plurality of clusters for the speech media file 110 and transfers the cluster spaces for diarizing another media file with other speeches. The speaker diarization process 140 may utilizes a deep learning and transfer learning process 161 in order to determine cluster actions during diarization and in order to transfer cluster spaces to other diarization instances. The speaker diarization process 140 indicates a functionality of the speaker diarization engine 120 and may or may not be implemented as a separate program process. Further description of the speaker diarization process 140 is presented in description of blocks 220 through 280 of FIG. 2.

A cluster space 150 of the one or more cluster space corresponds to a speaker in the speech media file 110. The speech media file 110 may have one or more speakers including the speaker. The cluster space 150 includes one or more cluster indicating a continuous portion of the speech by the speaker. The speaker may have a distinctive manner of speech, or vocalization, which is represented as a cluster epicenter of the speaker. The cluster epicenter is a collection of average values for numerous aspects of the vocalization unique to the speaker or to a session/cluster that may be utilized in identifying the speaker for a certain session/cluster. Exemplary aspects of the cluster epicenter may be, but are not limited to, accent, pronunciation, articulation, roughness, nasality, pitch, volume, and speed. The speaker diarization process 140 may identify the speaker for a session in the speech if the session demonstrates a certain manner of speech/vocalization specified for the speaker, in terms of the aspects specified by the cluster epicenter.

Figure 2:
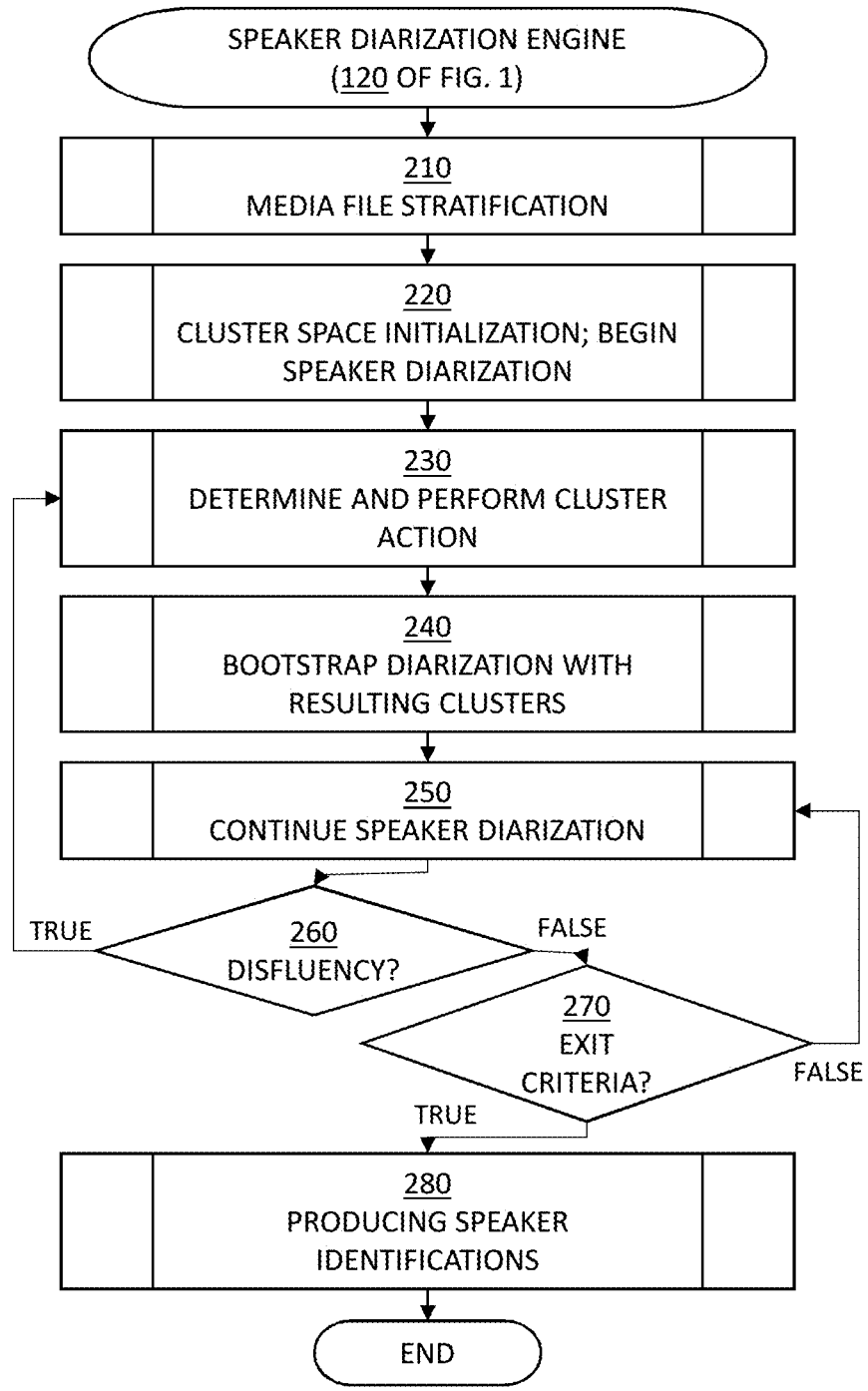
FIG. 2 depicts a flowchart performed by the speaker diarization engine of the system, in accordance with one or more embodiments set forth herein.

FIG. 2 depicts a flowchart performed by the speaker diarization engine 120 of FIG. 1, in accordance with one or more embodiments set forth herein.

In block 210, the speaker diarization engine 120 stratifies a media file including speech. The media file may be, but are not limited to, a live video stream or a recorded video clip having speech audio, or simply the speech file or livestream audio. In order to minimize disfluencies in sessions of the speech, the speaker diarization engine 120 may stratify the media file by diving the speech at where such disfluencies appear. Examples of disfluencies in a speech may be, but are not limited to, a pause wherein the speech is completely blocked without a sound, repetitions of whole words or parts of words, all pronunciation issues such as prolongations/murmuring/stuttering of sounds, filler words in the speech, overlapped speeches by more than one speaker at one time, or a background/electrical noise, etc. As a result, the speaker diarization engine 120 generates multiple stratified speech sessions having similar unit sizes from the speech in the media file for further processing. Each stratified session of the speech is a processing unit for the speaker diarization in identifying the speaker for respective stratified session. In certain embodiments of the present invention, the speaker diarization engine 120 may utilize a media data handling tool package such as FFmpeg for speech stratification at block 210. Examples of the media file may be in formats of a .VOD indicating a video on demand file, a .HLS indicating a HTTP live streaming file, etc. In certain embodiments of the present invention, the speaker diarization engine 120 produces stratified sessions with a transcript of the session, beginning and end timestamps per channel, respectively. For example, a stratified session may be expressed as a tuple {"transcript": "and next over not left on bunker from one fifty seven back in a braid and eight nine", "leftStartTime": "0.8", "leftEndTime": "1.39", "rightStartTime": "6.37", "rightEndTime": "6.64"}, {"transcript": "fifteen we have to be through the trade and then at eighty eight lob wedge", "leftStartTime": "55.95", "leftEndTime": "56.36", "rightStartTime": "59.17", "rightEndTime": "59.47"}, or {"transcript": "and things under in", "leftStartTime": "60.26", "leftEndTime": "60.92", "rightStartTime": "61.88", "rightEndTime": "62.18"}, where the timestamps including leftStartTime, leftEndTime, rightStartTime, and rightEndTime are instantiated by respective time duration values in second unit. Then the speaker diarization engine 120 proceeds with block 220.

In block 220, the speaker diarization engine 120 initializes cluster spaces for respective speakers by diarizing a number of sessions preconfigured for initialization and subsequently begins speaker diarization by use of the initialized cluster spaces. In certain embodiments of the present invention, the speaker diarization engine 120 performs initial diarization by identifying respective speakers of a preconfigured number of sessions and adds the diarized sessions as clusters to the respective cluster spaces corresponding to each speaker. In this specification, the term session is used to indicate portions of the speech from the stratification, primarily based on size and/or disfluencies, and prior to the speaker diarization. The term cluster is used to indicate another portions of the speech that correspond to speakers of the respective clusters, as resulting from the speaker diarization. The boundaries of the sessions and the boundaries of the clusters may or may not coincide. According to the initialized cluster spaces, the speaker diarization engine 120 performs diarization upon the sessions resulting from block 210 and identifies a speaker for a session, and makes a cluster as a combination of the session, the identified speaker, and confidence in identifying the speaker for the session. All clusters diarized for a certain speaker are collectively referred to as a cluster space. The speaker diarization engine 120 aggregate the cluster into the cluster space of the identified speaker. Exemplary clusters may be represented as, {"speaker": "0", "from": "6.37", "to": "6.64", "confidence": "0.393"}, or [ . . . {"speaker": "1", "from": "59.17", "to": "59.47", "confidence": "0.521"}, {"speaker": "0", "from": "60.26", "to": "60.92", "confidence": "0.578"}, . . . ], where there are two speakers "0" and "1", two timestamps "from" and "to" indicates a beginning and an end of each cluster, and "confidence" indicates the level of confidence in identifying respective clusters as spoken by respective speaker as represented in "speaker" values. Then the speaker diarization engine 120 proceeds with block 230.

In certain embodiments of the present invention, the speaker diarization engine 120 represents each cluster as a tuple including a session, a speaker identified for the session, and confidence measure in identifying the speaker. The speaker diarization engine 120 identifies the speaker for the session/cluster by use of various aspects of vocalization/manner of speech and corresponding average values typical to the speaker, which is collectively referred to as a cluster epicenter corresponding to the speaker/cluster. Exemplary aspects of a cluster epicenter may be, but are not limited to, accent, pronunciation, articulation, roughness, nasality, pitch, volume, and speed. An individual speaker may have a set of values for the cluster epicenter aspects distinctive from another speaker, by which the speaker diarization engine 120 identifies the speakers. By accumulating knowledge on the cluster spaces, the speaker diarization engine 120 may very accurately and confidently identify respective speakers based on results from previous diarization by use of cluster transfer.

In block 230, the speaker diarization engine 120 determines a cluster action by applying a deep learning process on the initial cluster space from block 220 and incoming stream/sessions during diarization. The speaker diarization engine 120 subsequently performs the determined cluster action. The deep learning and/or transfer learning process indicates a types of machine learning tool such as long short-term memory (LSTM) recurrent neural network (RNN) as well as deep neural network (DNN). As noted, cluster spaces may be learned and knowledge on past cluster spaces may be transferred by use of the deep/transfer learning. Then the speaker diarization engine 120 proceeds with block 240.

In certain embodiments of the present invention, the cluster action may be selected from, Merge, Split, Removal, and Maintain. The cluster action Merge directs the speaker diarization engine 120 to merge a cluster with a previous cluster because the previous cluster and the cluster shares the same speaker, based on similar/identical cluster epicenters of the respective clusters. The cluster action Split directs the speaker diarization engine 120 to split a cluster into two or more clusters because the cluster has two or more speakers identified, based on varying cluster epicenters within the cluster. The cluster action Removal directs the speaker diarization engine 120 to remove a cluster because the cluster does not correspond to a speaker wherein no discernable speech is detected in the cluster. The cluster action Maintain directs the speaker diarization engine 120 to keep a cluster in a present state because the cluster corresponds to one speaker and because a preceding cluster has a speaker distinctive from the speaker of the cluster. In order to improve confidence of speaker labels as identified during the diarization, the speaker diarization engine 120 apply the deep learning process in merging human reinforcement on the cluster evidences with the cluster spaces learned from previous diarization. By use of the human reinforcement learning, the speaker diarization engine 120 reviews and adjusts speaker labels according to inputs/feedbacks from human listeners.

In block 240, the speaker diarization engine 120 bootstraps the speaker diarization with clusters resulting from the cluster action of block 230. Once the speaker diarization engine 120 determines and performs a cluster action that changes present boundaries of clusters, a set of clusters distinctive from prior to performing the cluster action may result. Accordingly, the speaker diarization engine 120 restarts the speaker diarization from the beginning of the speech with the resulting clusters. The cluster evidences stored so far as well as gathered through human reinforcement are transferred to a next round of the speaker diarization as the initial cluster spaces such that the speaker diarization engine 120 may perform more accurate diarization based on the transferred cluster spaces and such that the speaker diarization engine 120 may take the cluster evidences and the human reinforcement learned during diarizing earlier part of the media file throughout the whole media file, resulting in more accurate diarization in later part of the media file. Then the speaker diarization engine 120 proceeds with block 250.

In block 250, the speaker diarization engine 120 continues diarization of a next session in the speech, as restarted from block 240 by identifying a speaker of the next session and by adding another cluster to the cluster space of the speaker. As in block 220, the cluster includes the session, the identified speaker for the session, and the confidence in the identification of the speaker. Then the speaker diarization engine 120 proceeds with block 260.

In block 260, the speaker diarization engine 120 determines whether or not a next session has a disfluency. In preparing the media file into sessions in block 210, the speaker diarization engine 120 separated the media file at the points of disfluencies such that each session would not have any disfluency within session. The speaker diarization engine 120 looks for any disfluency that had not been removed by stratification at block 260 such as pauses, echoes, background noises, or any other disfluencies that are still left in the session. If the speaker diarization engine 120 discovers a disfluency in the next session, then the speaker diarization engine 120 loops back to block 230 in order to split the session at the point of the discovered disfluency in diarizing the session into clusters. If the speaker diarization engine 120 discovers no disfluency in the next session, then the speaker diarization engine 120 proceeds with block 270.

In certain embodiments of the present invention, the speaker diarization engine 120 may apply different set of standards in disfluency detection from block 210 to block 260. For example, the disfluency for stratifying the media file at block 210 may have been a threshold disfluency length of X seconds, but at block 260, the speaker diarization engine 120 may look for a much shorter disfluencies having a half of the threshold disfluency length, that is, X/2 seconds.

In block 270, the speaker diarization engine 120 determines whether or not the clusters meet one of exit criteria, indicating the speech is completely diarized. Examples of the exit criteria may include, discovering that a last session of the speech has been diarized at block 250, etc. If the speaker diarization engine 120 determines that one of the exit criteria has been met, then the speaker diarization engine 120 finishes the speaker diarization and proceeds with block 280. If the speaker diarization engine 120 determines that there are more sessions to diarize, then the speaker diarization engine 120 loops back to block 250 to diarize the next session of the speech.

In block 280, the speaker diarization engine 120 produces respective speaker identifications for each cluster of the speech for a user. The speaker identification for a cluster has a speaker label for the cluster that identifies who spoke the cluster, and confidence corresponding to the speaker label, which represents how confident the speaker diarization engine 120 is in the speaker label for the cluster. Exemplary speaker identification output may be a series of cluster tuples including a speaker label, transcript, beginning and ending timestamps of the cluster, such as b'{"model batch1": [{"speaker": "Speaker0", "confidence": "0.526", "transcript": "a lot of German mark pleasure to Rome", "leftStartTime":"5.32", "leftEndTime": "5.5", "rightStartTime": "7.26", "rightEndTime": "7.63"}, . . . {"speaker": "Speaker2", "confidence": "0.689", "transcript": "but to have but now it was one of them way I\'m I\'m fifty fifty often off and and hopefully do it said both nothing for those nations", "leftStartTime": "448.09", "leftEndTime": "448.33", "rightStartTime": "454.97", "rightEndTime": "455.44"}, . . . ] Then the speaker diarization engine 120 terminates processing the speech from the media file at block 210.

The speaker identifications produced by the speaker diarization engine 120 may be transferred for diarizing other media files as initial cluster spaces such that clusters spoken by a speaker whose cluster epicenter is well-established with a plenty of evidences in the initial cluster space may be very accurately diarized from the beginning of the media file.

Certain embodiments of the present invention may offer various technical computing advantages, including automatically rearranging segmentation of clusters by use of cluster actions and automatically initializing a cluster space for continued diarization by transferring the cluster space from diarization with the previous segmentation of a media file. Accordingly, the accuracy of the continued diarization would dramatically improve as being benefited from the cluster space which includes cumulated evidences in identifying respective speakers. Certain embodiments of the present invention also offer media file stratification in minimizing disfluencies in sessions dividing the media file, such that the diarization may be performed more efficiently. Natural language interfaces utilizing certain embodiments of the present invention are enabled to distinguish whether or not an intended speaker speaks at the beginning of a conversation, and may engage only the intended speaker for further conversation right from the beginning. Also by use of multithreading and/or multiprocessing, speaker diarization services offered by certain embodiments of the present invention may be concurrently rendered for any number of media files/live streams. Certain embodiments of the present invention may be implemented by use of a cloud platform/data center, and the speaker diarization services may be provided as a subscribed service for organizational clients, broadcasting companies, etc. Certain embodiments of the present invention improves the communicability and the user-friendliness of the media files/live streams by informing users of who is speaking, when and what, and may improve efficiencies of various areas of speech-based communication.

Figure 3:
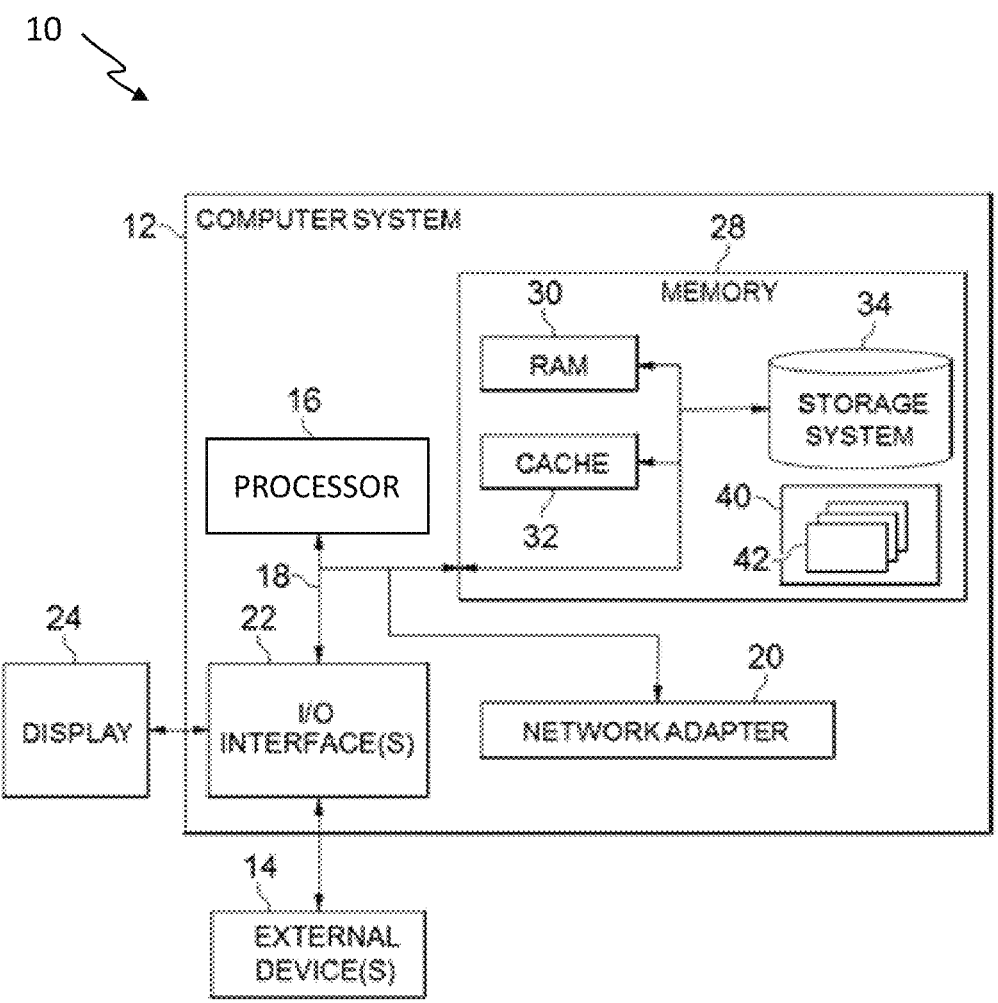
FIG. 3 depicts a cloud computing node according to an embodiment of the present invention.
Figure 4:
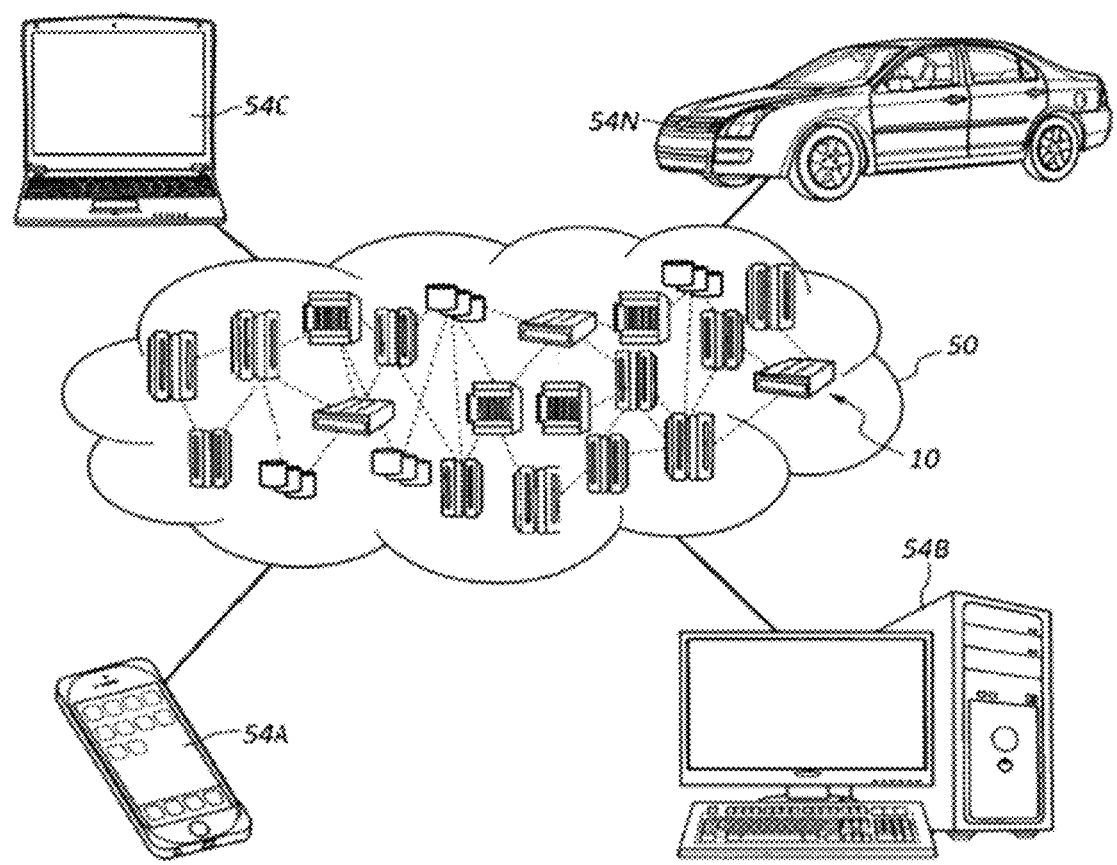
FIG. 4 depicts a cloud computing environment according to an embodiment of the present invention.
Figure 5:
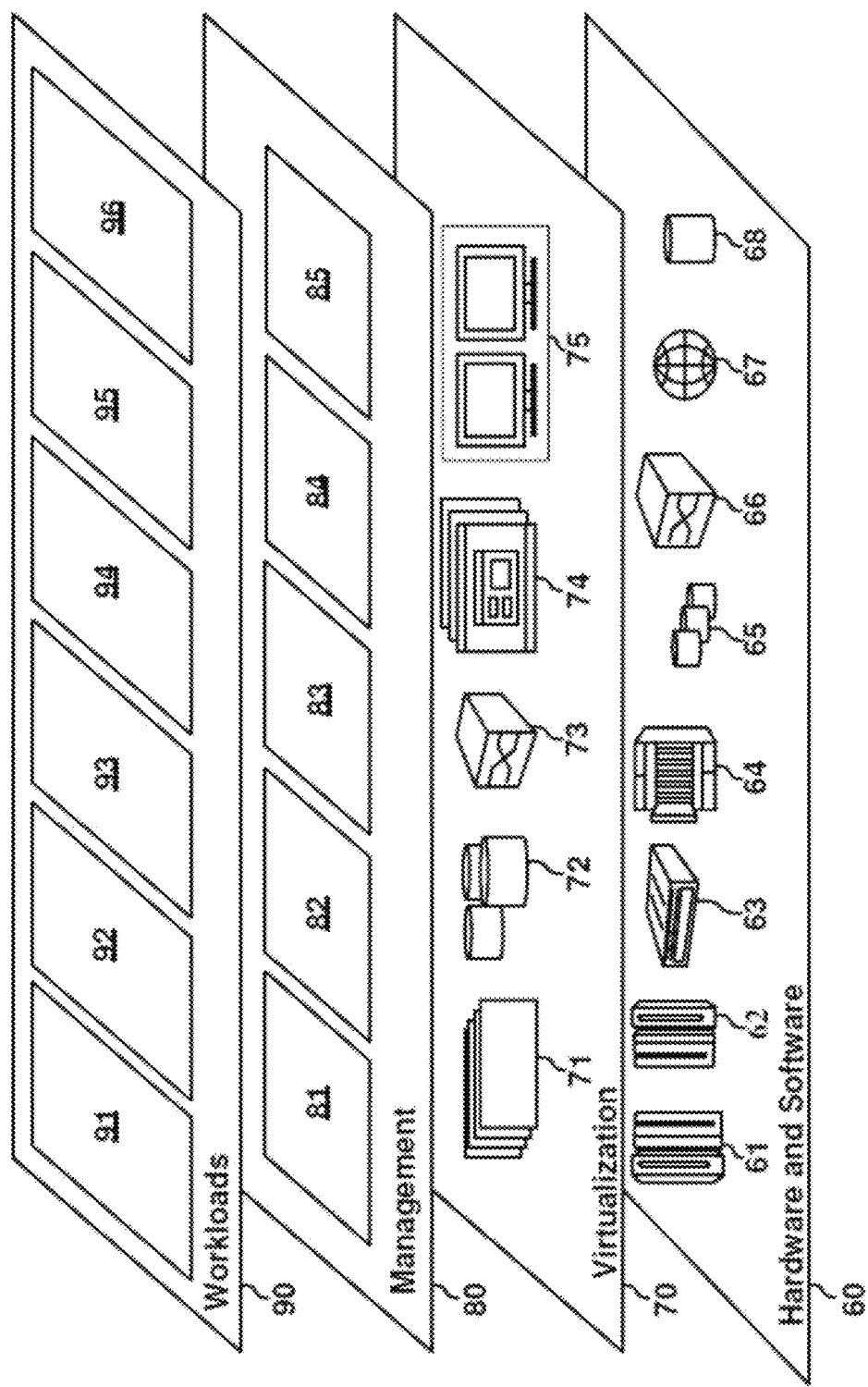
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the speaker diarization engine 120 of FIG. 1. Program processes 42, as in the speaker diarization engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the speaker diarization engine 96, as described herein. The processing components 96 can be understood as one or more program 40 described in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining a media file having a speech by one or more speaker;
    stratifying the media file in order into a plurality of sessions at points of respective disfluencies in the speech;
    initializing one or more cluster space including one or more cluster, wherein the one or more cluster space respectively corresponds to the one or more speaker, wherein the one or more cluster results from identifying respective speaker of a predetermined number of session from the plurality of sessions;
    generating a cluster, wherein the generating a cluster includes identifying a speaker of a next session;
    determining a cluster action for the cluster based on a cluster epicenter;
    performing the cluster action from the determining on the one or more cluster space;
    bootstrapping the one or more cluster space resulting from the performing;
    generating another cluster by identifying speaker corresponding to another session from rest of the sessions; and
    producing speaker identifications respective to each cluster from the generating, wherein the method includes applying a first set of clusters to a machine learning structure for learning by the machine learning structure, the machine learning structure for use in returning cluster actions, wherein the method includes applying a second set of clusters to the machine learning structure for learning by the machine learning structure, wherein the second set of clusters are differentiated from the first set of clusters, wherein the cluster action is a Removal action that changes boundaries between clusters, wherein according to the Removal action a certain cluster is removed based on the certain cluster not including discernible speech.

2. The computer implemented method of claim 1, wherein the first set of clusters are for a certain speaker and define a cluster space for the certain speaker, wherein the applying the second set of clusters to the machine learning structure is performed after the performing the cluster action, wherein a differentiation between the second set of clusters and the first set of clusters is in dependence on the performing the cluster action.

3. The computer implemented method of claim 1, wherein the first set of clusters are for a certain speaker and define a cluster space for the certain speaker, wherein the applying the second set of clusters to the machine learning structure is performed after the performing the cluster action, wherein a differentiation between the second set of clusters and the first set of clusters is in dependence on the performing the cluster action.

4. The computer implemented method of claim 1, the stratifying comprising: ascertaining that the media file includes a disfluency longer than a preconfigured threshold disfluency length; and segmenting the media file into a first segment that precedes the disfluency and a second segment that succeeds the disfluency, by setting respective beginning timestamps and ending timestamps accordingly.

5. The computer implemented method of claim 1, the initializing comprising: obtaining the one or more cluster space based on previous speaker identifications and cluster epicenters respectively associated with speakers by transfer learning and/or by reinforcement learning.

6. The computer implemented method of claim 1, wherein a subsequent cluster action is selected from the group consisting of Merge, Split, Removal, and Maintain, based on at least one of the following selected from the group consisting of a speaker identity of a cluster, respective speaker identities of immediately consecutive clusters, and fluctuation in values for a cluster epicenter.

7. The computer implemented method of claim 1, wherein a cluster epicenter corresponds to either a speaker or a cluster, wherein the cluster epicenter indicates a manner of speech either by the speaker or represented in the cluster, and wherein the cluster epicenter includes average values of accent, pronunciation, articulation, roughness, nasality, pitch, volume, and speed.

8. The computer implemented method of claim 1, further comprising: discovering a disfluency from a session while executing the generating another cluster; and determining another cluster action for the session based on a cluster epicenter of the session by use of deep learning.

9. The computer implemented method of claim 1, wherein the speaker identifications respective to each cluster includes a beginning timestamp of a cluster, an ending timestamp of the cluster, a transcript of the cluster, a speaker identity of the cluster, and a confidence in the speaker identity in a probabilistic value.

10. The computer implemented method of claim 1, wherein the speaker identifications respective to each cluster includes a beginning timestamp of a cluster, and an ending timestamp of the cluster.

11. A computer program product comprising:
a computer readable storage medium readable by one or more processing circuit and storing instructions for execution by one or more processor for performing a method comprising:
obtaining a media file having a speech by one or more speaker;
stratifying the media file in order into a plurality of sessions at points of respective disfluencies in the speech;
initializing one or more cluster space including one or more cluster, wherein the one or more cluster space respectively corresponds to the one or more speaker, wherein the one or more cluster results from identifying respective speaker of a predetermined number of session from the plurality of sessions;
generating a cluster, wherein the generating a cluster includes identifying a speaker of a next session;
determining a cluster action for the cluster based on a cluster epicenter;
performing the cluster action from the determining on the one or more cluster space;
bootstrapping the one or more cluster space resulting from the performing;
generating another cluster by identifying speaker corresponding to another session from rest of the sessions; and
producing speaker identifications respective to each cluster from the generating, wherein the method includes applying a first set of clusters to a machine learning structure for learning by the machine learning structure, the machine learning structure for use in returning cluster actions, wherein the method includes applying a second set of clusters to the machine learning structure for learning by the machine learning structure, wherein the second set of clusters are differentiated from the first set of clusters, wherein the cluster action is a Removal action that changes boundaries between clusters, wherein according to the Removal action a certain cluster is removed based on the certain cluster not including discernible speech.

12. The computer program product of claim 11, wherein the first set of clusters are for a certain speaker and define a cluster space for the certain speaker, wherein the applying the second set of clusters to the machine learning structure is performed after the performing the cluster action, wherein a differentiation between the second set of clusters and the first set of clusters is in dependence on the performing the cluster action.

13. The computer program product of claim 11, wherein the first set of clusters are for a certain speaker and define a cluster space for the certain speaker, wherein the applying the second set of clusters to the machine learning structure is performed after the performing the cluster action, wherein a differentiation between the second set of clusters and the first set of clusters is in dependence on the performing the cluster action.

14. The computer program product of claim 11, the stratifying comprising: ascertaining that the media file includes a disfluency longer than a preconfigured threshold disfluency length; and segmenting the media file into a first segment that precedes the disfluency and a second segment that succeeds the disfluency, by setting respective beginning timestamps and ending timestamps accordingly.

15. The computer program product of claim 11, the stratifying comprising: ascertaining that the media file includes a disfluency longer than a preconfigured threshold disfluency length; and segmenting the media file into a first segment that precedes the disfluency and a second segment that succeeds the disfluency, by setting respective beginning timestamps and ending timestamps accordingly.

16. The computer program product of claim 11, initializing comprising: obtaining the one or more cluster space based on previous speaker identifications and cluster epicenters respectively associated with speakers by transfer learning and/or by reinforcement learning.

17. The computer program product of claim 11, wherein a subsequent cluster action is selected from the group consisting of Merge, Split, Removal, and Maintain, based on at least one of the following selected from the group consisting of a speaker identity of a cluster, respective speaker identities of immediately consecutive clusters, and fluctuation in values for a cluster epicenter.

18. The computer program product of claim 11, wherein a cluster epicenter corresponds to either a speaker or a cluster, wherein the cluster epicenter indicates a manner of speech either by the speaker or represented in the cluster, and wherein the cluster epicenter includes average values of accent, pronunciation, articulation, roughness, nasality, pitch, volume, and speed.

19. The computer program product of claim 11, further comprising: discovering a disfluency from a session while executing the generating another cluster; and determining another cluster action for the session based on a cluster epicenter of the session by use of deep learning.

20. A system comprising:
a memory;
one or more processor in communication with the memory; and
program instructions executable by the one or more processor via the memory to perform a method comprising:
obtaining a media file having a speech by one or more speaker;
stratifying the media file in order into a plurality of sessions at points of respective disfluencies in the speech;
initializing one or more cluster space including one or more cluster, wherein the one or more cluster space respectively corresponds to the one or more speaker, wherein the one or more cluster results from identifying respective speaker of a predetermined number of session from the plurality of sessions;
generating a cluster, wherein the generating a cluster includes identifying a speaker of a next session;
determining a cluster action for the cluster based on a cluster epicenter;
performing the cluster action from the determining on the one or more cluster space;
bootstrapping the one or more cluster space resulting from the performing;
generating another cluster by identifying speaker corresponding to another session from rest of the sessions; and
producing speaker identifications respective to each cluster from the generating, wherein the method includes applying a first set of clusters to a machine learning structure for learning by the machine learning structure, the machine learning structure for use in returning cluster actions, wherein the method includes applying a second set of clusters to the machine learning structure for learning by the machine learning structure, wherein the second set of clusters are differentiated from the first set of clusters, wherein the cluster action is a Removal action that changes boundaries between clusters, wherein according to the Removal action a certain cluster is removed based on the certain cluster not including discernible speech.

* * * * *